Sept. 12, 1950     E. C. FURMAN ET AL     2,522,171
METHOD OF REPAIRING OLD PIPE LINES
Filed Aug. 9, 1946     3 Sheets-Sheet 1
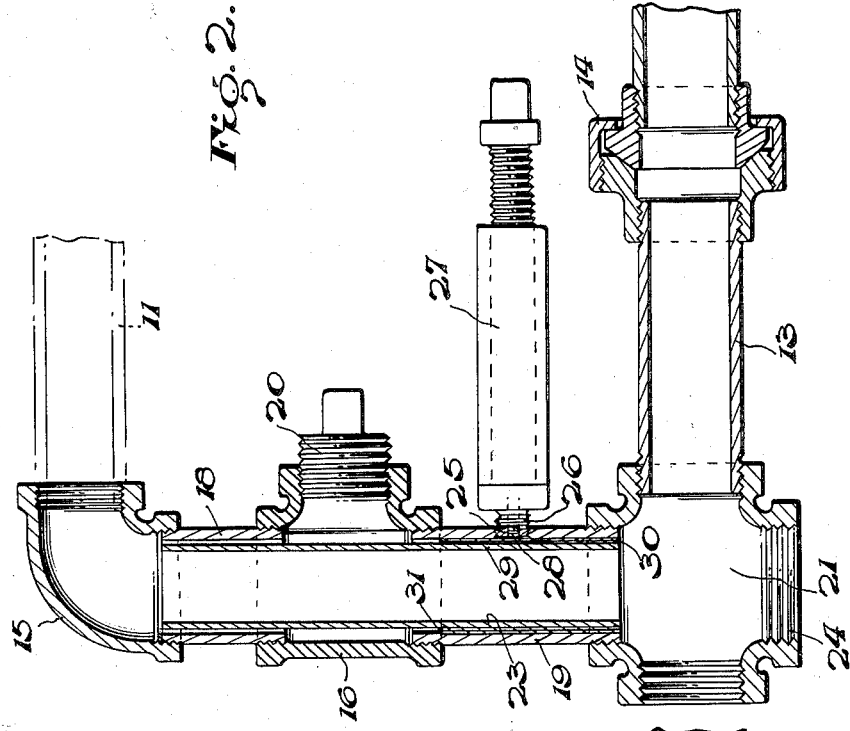
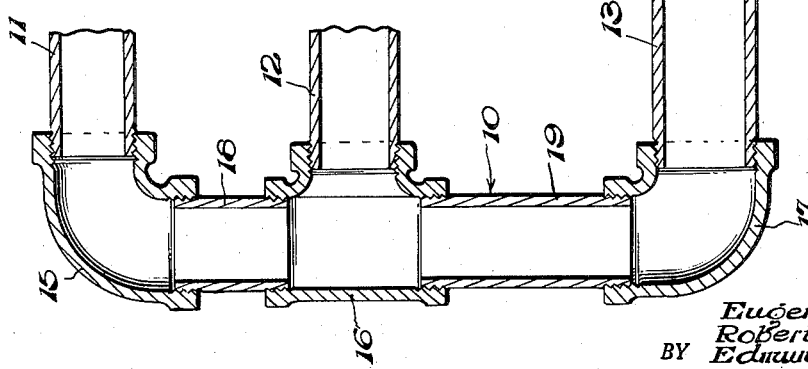
INVENTORS
Eugene C. Furman
Robert E. Furman
BY Edmund F. Heard.
Cameron, Kerkam & Sutton
Attorneys

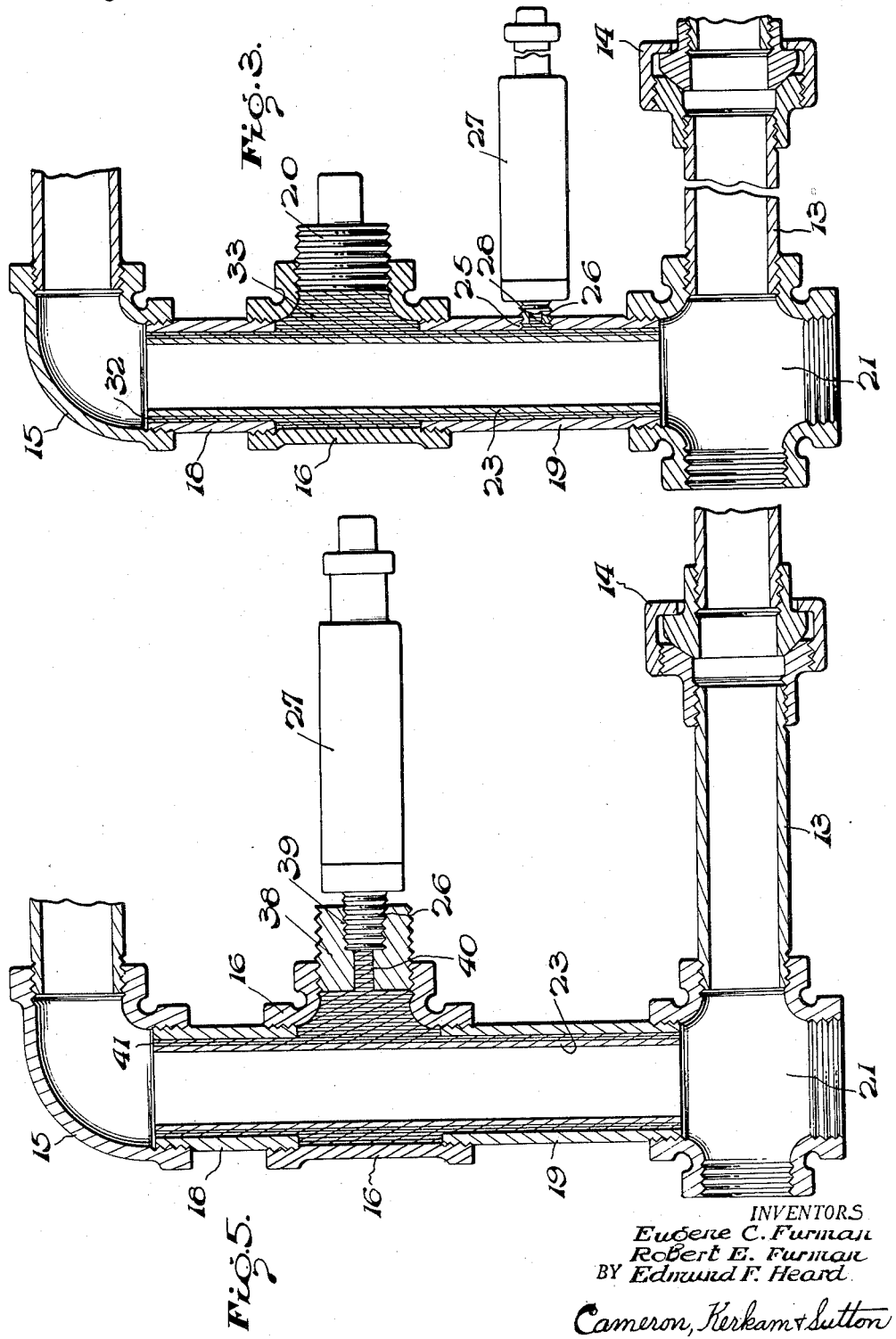

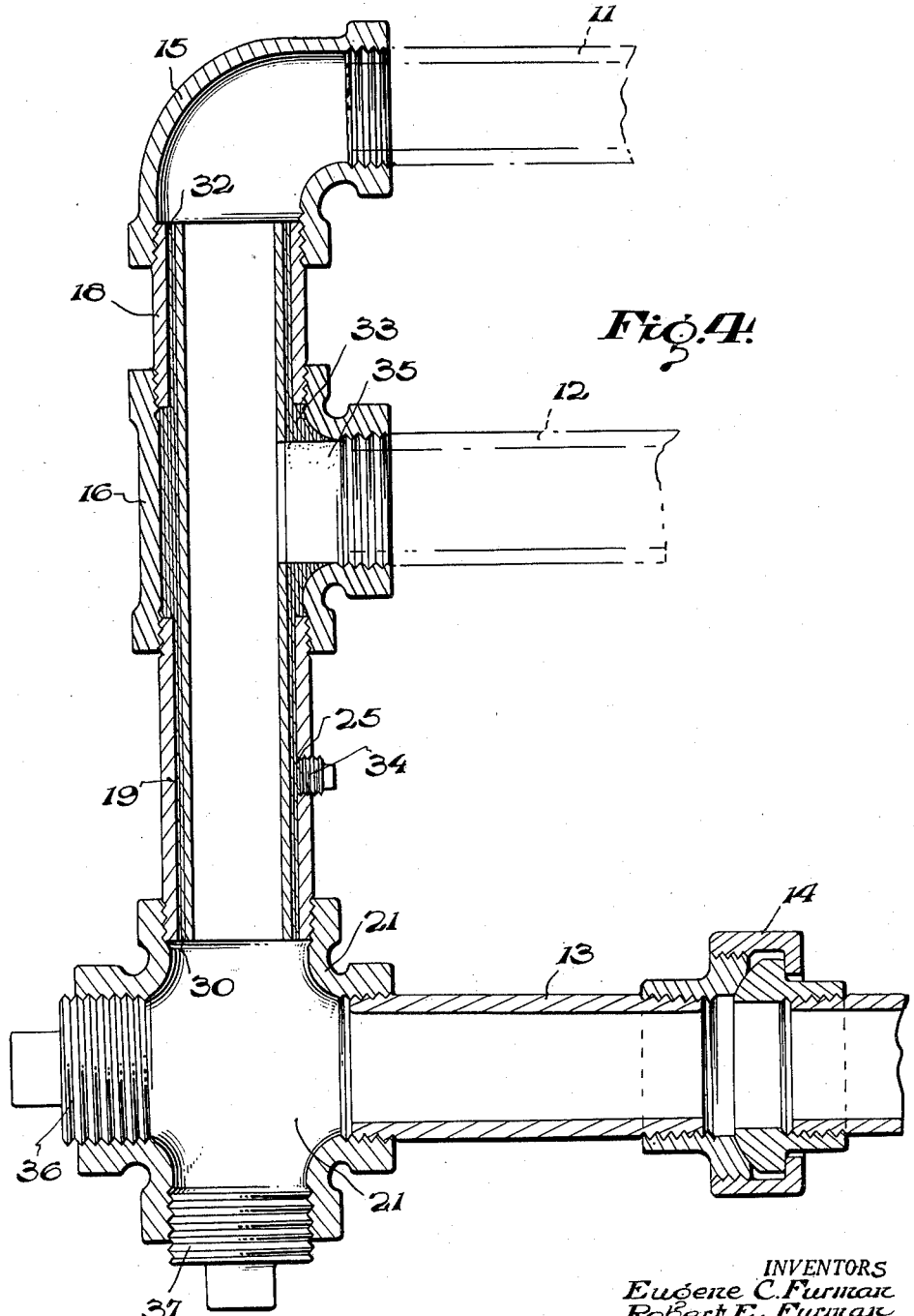

Patented Sept. 12, 1950

2,522,171

UNITED STATES PATENT OFFICE 2,522,171

METHOD OF REPAIRING OLD PIPE LINES

Eugene C. Furman, Hampton, Robert E. Furman, Norfolk, and Edmund F. Heard, Hampton, Va.; said Heard assignor to said Eugene C. Furman and said Robert E. Furman Application August 9, 1946, Serial No. 689,476

15 Claims. (Cl. 154—82)

This invention relates to a method for repairing old pipe lines which have rusted, wasted away or otherwise deteriorated to a point where they are leaking or in imminent danger of leaking.

The present invention may be applied to pipe lines of any suitable construction, arrangement and length, and composed of pipe sections and fittings of any suitable material, such as steel, iron, brass, bronze, copper, etc.

It is an object of this invention to provide a method of the type characterized which is of particular utility in repairing old pipe lines that are buried in cement floors, or are inside of plastered walls or ceilings, or are cemented in, under or behind tiled spaces, partitions, etc., or where for any reason the tearing out of a cement, plaster, tilting, or other wall or the like in order to gain access to the piping would be a burdensome or expensive proceeding.

Another object of this invention is to provide a method of the type characterized which can be readily applied without discontinuing the use of the building, or the room or other space in, under or behind the floor, wall, or ceiling of which the repair is to be effected.

Another object of this invention is to provide a method of the type characterized which is of particular utility in repairing old pipe lines which underlie streets, sidewalks or other pavements so that repairs may be effected in a utility line running from the street to the service line of a building, for example, without digging up the street or other pavement.

Another object of this invention is to provide a method of the type characterized which can be applied without materially diminishing the flow capacity of the pipe line so repaired.

Another object of this invention is to provide a method of the type characterized which may be used without requirement for highly skilled labor or expensive equipment.

Another object of this invention is to provide a method of the type characterized which is widely applicable to different forms, constructions and arrangements of pipe lines and which can be applied with a minimum of interruption of the service of the pipe line under repair.

Another object of this invention is to provide a method of the type characterized which is economical and rapid in application so that deteriorated pipe lines may be quickly, easily and inexpensively repaired with minimum inconvenience.

Other objects will appear as the description of the invention proceeds.

Stated briefly, the method of the present invention consists in inserting inside of the deteriorated pipe line to be repaired a relatively thin liner which is only slightly smaller than the minimum inside bore of the pipe line to be repaired, and which preferably has a smooth or polished inner face so as to largely if not entirely compensate for the slight decrease in diameter insofar as the flow capacity of the repaired pipe line is concerned, and then quickly, economically and permanently cementing said liner in position so as properly to back and reenforce the liner as well as reenforce and strengthen the deteriorated pipe line.

By injecting the cement between the inside bore of the old pipe line and the outside surface of the liner, a protective support and sheath for the liner is effected whereby the liner may have a very thin wall both in the interest of low cost and in order that the interior diameter of the repaired pipe line shall be diminished as little as possible. By preference the liner is formed of commercial copper, brass or bronze tubing which normally has a very smooth or highly polished finish, whereby the lessened surface friction afforded by such an interior surface largely if not entirely compensates for the decrease in the bore of the repaired line insofar as the flow capacity of the line is concerned. Experience has shown that the smooth surface of said liner will frequently allow as much, and sometimes more, fluid to pass through it, notwithstanding its somewhat smaller inside diameter, than was permitted by the rougher surface of the old line, it being a fact well recognized in the plumbing and pipe fitting trade that when bronze, brass or copper tubing is installed in place of an old steel or iron pipe line, the next smaller size of piping may be used because of the greater flow capacity provided by the smoother inner surface.

The method of the present invention may be carried out in a variety of ways as will be apparent from the ensuing description and the accompanying drawings, and it is therefore to be expressly understood that the drawings are for purposes of illustration only, and are not intended to be a definition of the limits of the invention, reference being had to the appended claims for that purpose.

Referring in detail to the accompanying drawings wherein the same reference characters are employed to designate corresponding parts in the several figures, Fig. 1 is a somewhat diagrammatic section through an illustratory pipe line to be repaired;

Fig. 2 is a corresponding view illustrating the first step in a preferred practice of the present invention;

Fig. 3 is a corresponding view to illustrate succeeding steps in the practice of the invention;

Fig. 4 is a corresponding view somewhat enlarged to illustrate the completely repaired pipe line; and Fig. 5 is a view corresponding to Fig. 2 but illustrating an alternative procedure.

While the present invention may be applied, as will be apparent to those skilled in the art, to a wide variety of arrangements and constructions of pipe lines, it is here assumed for purposes of illustration that the deteriorated pipe line is a riser generally designated 10 in communication with a plurality of horizontal lines, here shown as three and designated 11, 12 and 13, such as might be used at three different floors of a building. Pipes 11, 12 and 13 may be of any suitable length such as commonly found in residences, factories, warehouses and other buildings. Pipe line 13 is shown as provided with a standard union coupling 14 such as is commonly installed to afford accessibility to the sections of a line of this character, and pipe lines 11 and 12 would also conventionally be provided with similar fittings but for simplicity of illustration they have been omitted. As shown, the riser 10 includes an elbow 15 in communication with the pipe line 11, a T fitting 16 in communication with the pipe line 12 and an elbow fitting 17 in communication with pipe line 13, with interposed sections of piping 18 and 19.

To practice the present invention as applied to the piping selected to illustrate the procedure, the horizontal pipe lines 11 and 12 are first disconnected from their fittings 15 and 16, and a pipe plug 20 is secured in the opening left in the fitting 16. Where as illustrated the pipe line 13 is connected to the riser through an elbow 17, the elbow 17 is replaced by a fitting having an opening in alignment with the line to be repaired, such as the standard four-way cross fitting 21 shown in Fig. 2, but if a fitting providing an aperture in alignment with the riser pipe 19 is already in position, such a replacement is unnecessary, the pipe in communication with such aperture in alignment with the riser pipe 19 merely being disconnected to proceed as next to be explained.

A liner 23 having a length approximately equal to the length of the line to be repaired, and here shown as the line composed of pipe section 18, T fitting 16 and pipe section 19, is then introduced through the opening 24 in fitting 21 and held in position in any suitable way, said liner 23 having an outside diameter which is only slightly smaller than the inside diameter of the pipe sections 18 and 19 and preferably though not necessarily composed of relatively thin brass, copper or bronze tubing, although any other suitable tubing may be used. Preferably for reasons explained the liner has a smooth or polished inner surface. A hole 25 is then drilled and tapped through one of the elements of the line being repaired, as the pipe section 19, at any suitable location where it is conveniently accessible, preferably at a distance of from eight to twelve inches from one extremity of the pipe line, in this case the section 19, to receive the threaded nipple 26 of a pressure gun 27 of any suitable construction.

Pressure gun 27 is charged with any suitable cement which can be forced through the aperture 28 in the nipple 26 thereof and into the narrow annular space 29 between the pipe section 19 and the liner 23. Any suitable cement setting by chemical action or by thermal action may be used. A leak sealing cement is available on the market which, when mixed to a dough-like consistency, can be forced through a pressure gun into the space to be filled and which cement will set in approximately thirty minutes at normal room temperatures but when heated to a temperature on the order of 200° F. will set in about two minutes. Such a cement is preferred for the practice of the present invention as will hereinafter appear, but it is to be expressly understood that the invention is not limited to the use of such a cement, as most if not all leak sealing cements have the characteristic of setting more rapidly at elevated temperatures, so that if preferred they can be used in the practice of the present invention by making allowance for the known characteristics of the cement employed.

The cement in pressure gun 27 is forced through the passage 28 into the annular space 29 between the old pipe section and the liner 23 until it starts to escape through the annular opening 30, at the extremity of the liner 23 that is closer to the opening 25. Injection of cement into said annular space is then temporarily discontinued and a blow torch, soldering iron or any other suitable source of heat is applied to the fitting 21 or adjacent portion of the pipe section 19, a temperature of approximately 200° F. being preferably applied for a period of approximately two minutes when using cement of the character heretofore referred to, so as to quickly harden an annular ring of cement at the end of the annular space between the pipe section 19 and the liner 23. Above this narrow annular ring of hardened cement the cement remains fluid and it may be assumed to have risen to the level indicated at 31 before it started to escape at opening 30. Injection of the cement is now recommended and continued until as shown in Fig. 3 the cement begins to escape through the annular opening 32 at the opposite end of the annular space between the liner 23 and the pipe section 18. Injection of cement may then again be discontinued and heat applied to the fitting 15 or adjacent portion of the pipe section 18, preferably at a temperature of approximately 200° F. for a period of approximately two minutes when using cement of the character heretofore referred to, to harden and set a narrow annular ring of cement at this extremity of said annular space. While the cement at the two extremities of the annular space between the liner and the old pipe line has now been set so as to prevent further escape of cement, the cement intermediate these hardened rings is still in fluid condition. Injection of cement is then resumed until all of the void spaces between the liner 23 and the old pipe line, including the spaces 33 in the T coupling 16, are completely filled with cement, sufficient pressure being applied to the pressure gun 27 so as to assure that the cement is compacted throughout this annular space with no voids left therein. All of the cement in said annular space is now allowed to harden and set, this requiring a period of approximately thirty minutes at normal room temperatures when using the preferred cement above referred to, although if desired this period can be shortened by appropriate application of heat to the cement filling said annular space. While ordinarily it is preferred to interrupt the injection of cement and harden a ring of cement at both extremities of said annular space, when conditions are such that by the time the cement starts to escape at the second extremity of the annular space it is apparent that all of said annular space is completely filled with compacted cement the second referred to interruption of injection and production of a ring of hardened cement can be eliminated, and all of the cement thereupon hardened as last referred to.

When sufficient time has elapsed for the cement to harden the pressure gun 27 is removed, and a metal plug 34 is threaded into the aperture 25. Pipe plug 20 is now removed from T fitting 16 and a hole 35 is drilled through the cement and liner 23. Pipe lines 11 and 12 are now reconnected to the fittings 15 and 16 and the fitting 21 may be replaced by the fitting 17 for connection of the line 13 or, if preferred, the fitting 21 may be left in place as shown in Fig. 4 and the extra openings closed by standard pipe plugs 36 and 37.

Sometimes it is inconvenient or undesirable to drill and tap a hole 25 through one of the old pipes, and when such is the situation one of the fittings in the line to be repaired, as 16 in the example under discussion, may be provided with a threaded plug 38 having a tapped aperture 39 for receiving the nipple 26 of the pressure gun 27, aperture 39 being continued by a passage 40 leading to the annular space between the liner and the pipe line to be repaired. Suitable cement is then injected into the annular space between the liner and the old pipe line until the cement begins to escape at one end of the said annular space, which will usually be the end of said annular space nearer the fitting to which the pressure gun is attached, 41 in the illustration of Fig. 5. Injection of the cement is then discontinued and the cement at end 41 of said annular space is hardened by application of heat on the order of 200° F. for a period on the order of two minutes when using cement of the character heretofore referred to, after which injection of cement is continued until it begins to escape at the opposite end of said annular space. A ring of hardened cement may then be similarly formed at the latter end of the annular space, after which the cement is injected into the annular space until all voids have been eliminated and the cement is compacted under pressure throughout the length of said annular space as above explained. The pressure gun is then removed and after the cement has had time to set throughout the aperture 35 is formed through the hardened cement and liner as in the illustration of Fig. 3.

Thus, by the practice of the method as above explained, an annular ring of hardened cement is first formed at one end of the annular space between the liner and the old pipe line by means of a local application of heat for a short period of time without hardening the remainder of the cement, after which the injection of cement causes the cement to flow lengthwise of the pipe line to the opposite extremity of said annular space. Again a hardened ring of cement may be formed at the last named extremity without affecting the fluidity of the remainder of the cement in the aforesaid annular space. Then the cement can be forced into said annular space between the liner and the old pipe line, owing to the continued fluidity of the cement except at the opposite extremities of said annular space, until a pressure is built up assuring that all voids are eliminated and the entire annular space between the liner and the old pipe line is completely filled with compacted cement, after which the cement is allowed to harden and form a complete support and reenforcement for the liner as well as a fluid-tight seal between the liner and the old pipe line throughout the length of the latter. By successively sealing all openings through which the fluid leak sealing compound can escape, after which additional pressure is put on that portion of the cement which remains fluid, a complete backing for the liner is assured throughout its length, while the old pipe line at the same time is reenforced and strengthened throughout to the same extent.

In certain installations there may not be sufficient length of space adjacent a fitting of the old pipe line to allow for a new liner of the full length of the old pipe line to be introduced. In such a situation a standard flexible metal piping which can be readily bent to conform with the limits of accessibility available can be used as the liner, and experience has demonstrated that such flexible piping can be used with success even in extremely restricted spaces. In place of using flexible piping, where the needs of accessibility require, the liner may be composed of a number of short lengths of pipe which are inserted one at a time and successively attached to each other in any suitable way, as by screw threads, until a liner of the desired length has been built up.

While it is preferred to harden the cement successively at the different locations at which the cement may escape as heretofore explained, it is within the broader contemplation of the present invention that, where for any reason local heating and differential hardening is undesirable or difficult of obtainment, the local application of heat to harden the cement at the apertures of escape may be omitted, and this is particularly true as to those apertures of escape which are most remote from the application of the pressure gun if local application of heat is used to prevent excessive escape of cement at the aperture or apertures nearer the application of the gun that are first reached by the cement.

If the end of the old pipe line to be repaired is inaccessible, or for other reasons it is desired to prevent escape of cement at one end of the annular space between the old pipe line and the liner without hardening the cement as heretofore explained at that end of said annular space, the end of the liner may be belled out or provided with a suitable washer so as to fit the old pipe line and thereby provide a closure for the corresponding end of the annular space. This procedure is particularly applicable when applying the invention to an old pipe line which extends under a street, sidewalk or other pavement, as between a main and a building.

Assume for purposes of illustration an old pipe line in the form of a utility line extending from a main under a street to a service line in a building. Particularly in congested regions or where the traffic is heavy it is highly undesirable to dig up the street in order to gain access to make needed repairs in such a line. In conformity with the present invention a suitable section of piping at or near a building, for example the section at the meter location, may be removed from the utility line. By inserting a rod of suitable length through the opening thus provided, and taking cognizance of the known diameter of the main, the length required for the liner can be easily determined. As under the assumption the joint between the utility line and the main is inaccessible, it will not be possible to form a hardened ring of cement at this end of the annular space between the liner and the old pipe line. Therefore the end of the liner which is to be adjacent the main is suitably belled out or provided with a washer or other suitable means so that it will fit the bore of the old pipe line at the junction thereof with the main. When the liner has been inserted so as to provide a narrow annular space between the old pipe line and the liner as heretofore explained, cement is injected into said annular space through any suitable aperture, provided as heretofore explained, until said annular space is completely filled with compacted cement. A ring of hardened cement may be formed at the building end of the line to be repaired when cement starts to escape at that end of the annular space, but thereafter injection of cement is continued until the entire annular space is completely filled with compacted cement, the belling, washer or other means at the opposite end of said annular space preventing escape of cement from said space into the main.

Also, if the character or location of the apertures at the extremities of the liner are such that excessive loss of cement does not occur, or where the gun is so located that the cement will reach all of the possible apertures for escape at substantially the same time, local hardening of the cement may be omitted without departing from the broader aspects of this invention. It is also within the contemplation of this invention that, where desired, drilled and tapped holes for application of the pressure gun may be formed at a plurality of locations along the line to be repaired so that, to avoid pumping of the cement for an undue length, the cement may be injected at a plurality of successive locations until the entire annular space between the liner and the old pipe line has been filled.

While the embodiments of the invention illustrated on the drawings have been described with considerable particularity it is to be expressly understood that the invention is not limited thereto. As will now be apparent to those skilled in the art the method of this invention may be applied in a variety of ways depending upon the character, construction, length, location, etc., of the pipe line to be repaired. A wide variety of cements can be used within the broader aspects of this invention and changes may be made in the equipment used, in the succession of steps and in the details of procedure, all as will now be apparent to those skilled in the art. Reference is therefore to be had to the appended claims for a definition of the limits of the invention.

What is claimed is:

1. The method of repairing old pipe lines while in place which includes the steps of opening the line to be repaired at one end to gain lengthwise access thereto, introducing into the line a relatively thin liner of a length approximating that of the line to be repaired and of an outside diameter slightly less than the minimum inside diameter of said line to provide a narrow annular space between the outside of said liner and the inside of said line, and injecting a cement under pressure from at least one point intermediate the length of the line and forcing the cement to flow into said annular space and lengthwise of the line in opposite directions until the said annular space is filled.

2. The method of repairing old pipe lines while in place which includes the steps of opening the line to be repaired at one end to gain lengthwise access thereto, introducing into the line a relatively thin liner of a length approximating that of the line to be repaired and of an outside diameter slightly less than the minimum inside diameter of said line to provide a narrow annular space between the outside of said liner and the inside of said line, injecting a cement under pressure into said annular space, when at at least one extremity of said annular space the cement begins to escape discontinuing the injection of cement and accelerating the hardening of the cement at said extremity only while leaving the remainder of the cement in said annular space in fluid condition, and then continuing the injection of cement under pressure to force the cement left in fluid condition to flow lengthwise of said annular space until said annular space is filled with compacted cement.

3. The method of repairing old pipe lines while in place which includes the steps of opening the line to be repaired at one end to gain lengthwise access thereto, introducing into the line a relatively thin liner of a length approximating that of the line to be repaired and of an outside diameter slightly less than the minimum inside diameter of said line to provide a narrow annular space between the outside of said liner and the inside of said line, boring a hole through said pipe line into said annular space near one end thereof, and injecting cement under pressure through said hole to fill said annular space between the liner and pipe line with compacted cement.

4. The method of repairing old pipe lines while in place which includes the steps of opening the line to be repaired at one end to gain lengthwise access thereto, introducing into the line a relatively thin liner of a length approximating that of the line to be repaired and of an outside diameter slightly less than the minimum inside diameter of said line to provide a narrow annular space between the outside of said liner and the inside of said line, forming a hole through said pipe line into said annular space near one end thereof, injecting cement under pressure through said hole into said annular space, when at least the extremity of said annular space nearer said hole the cement begins to escape discontinuing the injection of cement and accelerating the hardening of the cement at said extremity only while leaving the remainder of said cement in said annular space in fluid condition, and then continuing the injection of cement under pressure until said annular space is completely filled with compacted cement.

5. The method of repairing old pipe lines while in place which includes the steps of opening the line to be repaired at one end to gain lengthwise access thereto, introducing into the line a relatively thin liner of a length approximating that of the line to be repaired and of an outside diameter slightly less than the minimum inside diameter of said line to provide a narrow annular space between the outside of said liner and the inside of said line, preparing an opening in said line in communication with said annular space and through which cement may be forced under pressure into said annular space, and injecting cement under pressure through said opening into said annular space until said annular space is completely filled with compacted cement.

6. The method of repairing old pipe lines while in place which includes the steps of opening the line to be repaired at one end to gain lengthwise access thereto, introducing into the line a relatively thin liner of a length approximating that of the line to be repaired and of an outside diameter slightly less than the minimum inside diameter of said line to provide a narrow annular space between the outside of said liner and the inside of said line, preparing an opening in said line in communication with said annular space and through which cement may be forced under pressure into said annular space, injecting cement under pressure through said opening into said annular space, when at at least one extremity of said annular space the cement begins to escape discontinuing the injection of cement and accelerating the hardening of the cement at said extremity only while leaving the remainder of the cement in said annular space in a fluid condition, and then continuing the injection of cement under pressure until said annular space is completely filled with compacted cement.

7. The method of repairing old pipe lines while in place which includes the steps of opening the line to be repaired at one end to gain lengthwise access thereto, introducing into the line a relatively thin liner of a length approximating that of the line to be repaired and of an outside diameter slightly less than the minimum inside diameter of said line to provide a narrow annular space between the outside of said liner and the inside of said line, preparing a plurality of openings in communication with said annular space at a plurality of points along its length and injecting a cement under pressure into said annular space through said openings in succession until the entire annular space between said liner and said pipe line is filled with compacted cement.

8. The method of repairing old pipe lines while in place which includes the steps of opening the line to be repaired at one end to gain lengthwise access thereto, introducing into the line a relatively thin liner of a length approximating that of the line to be repaired and of an outside diameter slightly less than the minimum inside diameter of said line to provide a narrow annular space between the outside of said liner and the inside of said line, injecting a cement under pressure into said annular space, when at at least one extremity of said annular space the cement begins to escape discontinuing the injection of cement and accelerating the hardening of the cement at said extremity only while leaving the remainder of cement in said annular space in fluid condition, and then continuing the injection of cement under pressure to force the cement left in fluid condition along the length of said annular space until said annular space is completely filled with compacted cement.

9. The method of repairing old pipe lines while in place which includes the steps of opening the line to be repaired at one end to gain lengthwise access thereto, introducing into the line a relatively thin liner having a polished inner surface, a length approximating that of the line to be repaired and an outside diameter slightly less than the minimum inside diameter of said line to provide a narrow annular space between the outside of said liner and the inside of said line, forming an opening in said line in communication with said annular space and injecting a cement under pressure through said opening and into said annular space until the latter is filled with compacted cement.

10. The method of repairing old pipe lines while in place which includes the steps of opening the line to be repaired at one end to gain lengthwise access thereto, bending and introducing into the line a relatively thin liner of flexible tubing having a length approximating that of the line to be repaired and an outside diameter slightly less than the minimum inside diameter of said line to provide a narrow annular space between the outside of said liner and the inside of said line, preparing an opening in said line in communication with said annular space and through which cement may be forced under pressure into said annular space, and injecting a cement under pressure through said opening into said annular space until the same is filled with compacted cement.

11. The method of repairing old pipe lines while in place which includes the steps of opening the line to be repaired at one end to gain lengthwise access thereto, closing against the escape of cement any aperture in said line between the extremities thereof, installing in said line a liner of approximately the length of the line to be repaired and having an outside diameter slightly less than the minimum inside diameter of the line to be repaired to provide a narrow annular space between the outside of said liner and the inside of said line, injecting a cement under pressure into said annular space until said annular space is completely filled with compacted cement, and then after said cement has set boring through said cement and liner any hole that may be required to place the interior of said liner in communication with any pipe line leading from the repaired line between the extremities thereof.

12. The method of repairing old pipe lines while in place which includes the steps of opening the line to be repaired at one end to gain lengthwise access thereto, closing against the escape of cement any aperture in said line between the extremities thereof, installing in said line a liner of approximately the length of the line to be repaired and having an outside diameter slightly less than the minimum inside diameter of the line to be repaired, boring at least one hole through said pipe line to communicate with the annular space between said liner and pipe line, injecting a cement under pressure through said hole into said annular space until said annular space is completely filled with compacted cement, and then after said cement has set boring through said cement and liner any hole that may be required to place the interior of said liner in communication with any pipe line leading from the repaired line between the extremities thereof.

13. The method of repairing old pipe lines while in place which includes the steps of opening the line to be repaired at one end to gain lengthwise access thereto, closing against the escape of cement any aperture in said line between the extremities thereof, installing in said line a liner of approximately the length of the line to be repaired and having an outside diameter slightly less than the minimum inside diameter of the line to be repaired, injecting a cement under pressure into said annular space, when at at least one extremity of said annular space the cement begins to escape discontinuing the injection of cement and hardening the cement at said extremity while leaving the remainder of the cement in said annular space in a fluid condition, continuing the injection of cement until said annular space is completely filled with compacted cement, and then after said cement has set boring through said cement and liner any opening that may be required to place the interior of said liner in communication with any pipe line leading from the repaired line between the extremities thereof.

14. The method of repairing old pipe lines while in place which includes the steps of opening the line to be repaired at one end to gain lengthwise access thereto, introducing into the line a relatively thin liner of a length approximating that of the line to be repaired and of an outside diameter slightly less than the minimum inside diameter of said line to provide a narrow annular space between the outside of said liner and the inside of said line, injecting through an opening already existing in said pipe line a cement under pressure until the annular space between said liner and pipe line is completely filled with compacted cement, and then after said cement has set boring through said cement and liner any opening that may be required to place the interior of said liner in communication with any pipe line leading from the repaired line between the extremities thereof.

15. The method of repairing old pipe lines while in place which includes the steps of opening the line to be repaired at one end to gain lengthwise access thereto, installing in said line a liner of approximately the length of the line to be repaired and having an outside diameter slightly less than the minimum inside diameter of the line to be repaired to provide a narrow annular space between the outside of said liner and the inside of said line, injecting through an opening in said pipe line cement under pressure until said cement begins to escape at one extremity of said annular space, discontinuing the injection of cement and accelerating the hardening of the cement at said extremity while leaving the remainder of said cement in fluid condition, resuming the injection of cement under pressure until said cement left in fluid condition begins to escape at another extremity of said annular space, discontinuing the injection of cement and accelerating the hardening of the cement at said last named extremity while leaving the remainder of said cement in said annular space in fluid condition, and then resuming the injection of cement until said annular space is completely filled with compacted cement.

EUGENE C. FURMAN.
ROBERT E. FURMAN.
EDMUND F. HEARD.

REFERENCES CITED

The following references are of record in the file of this patent:

UNITED STATES PATENTS

| Number | Name | Date |
|---|---|---|
| 570,256 | Lavens | Oct. 27, 1896 |
| 1,485,512 | Le Cocq et al. | Mar. 4, 1924 |
| 1,620,154 | Furman | Mar. 8, 1927 |
| 1,652,562 | Day | Dec. 13, 1927 |
| 1,721,838 | Semon et al. | July 23, 1929 |
| 1,866,857 | Lindquist | July 12, 1932 |
| 1,947,581 | Cornelius | Feb. 20, 1934 |
| 2,424,878 | Crook | July 29, 1947 |